United States Patent
Davis et al.

(10) Patent No.: US 7,448,516 B2
(45) Date of Patent: Nov. 11, 2008

(54) ICE CREAM VENDING MACHINE

(75) Inventors: Robert Davis, Peoria, IL (US); Otis Westerfield, Peoria, IL (US); Jorgen Bailey, Sarasota Springs, UT (US)

(73) Assignee: Sunshine Ice Cream, Peoria, IL (US)

( * ) Notice: Subject to any disclaimer, the term of this patent is extended or adjusted under 35 U.S.C. 154(b) by 443 days.

(21) Appl. No.: 10/869,747

(22) Filed: Jun. 16, 2004

(65) Prior Publication Data

US 2004/0251270 A1    Dec. 16, 2004

Related U.S. Application Data

(60) Provisional application No. 60/478,919, filed on Jun. 16, 2003.

(51) Int. Cl.
   B67D 5/62    (2006.01)
   B67D 5/10    (2006.01)
   G07F 13/00    (2006.01)
   B65D 35/28    (2006.01)

(52) U.S. Cl. ............... 222/146.6; 222/2; 222/95; 222/96; 62/136

(58) Field of Classification Search ............ 222/2, 222/95, 96, 105, 94, 146.6, 63, 82, 83, 326, 222/387, 509; 62/136
   See application file for complete search history.

(56) References Cited

U.S. PATENT DOCUMENTS

| | | | | |
|---|---|---|---|---|
| 4,645,093 A | | 2/1987 | Jones | 221/93 |
| 4,652,862 A | * | 3/1987 | Verslycken | 340/540 |
| 5,027,698 A | | 7/1991 | Chirnomas | 99/450.1 |
| 5,180,024 A | * | 1/1993 | Eto | 180/41 |
| 5,344,046 A | * | 9/1994 | Maldanis et al. | 222/2 |
| 5,405,054 A | * | 4/1995 | Thomas | 222/95 |
| 5,410,888 A | * | 5/1995 | Kaiser et al. | 62/136 |
| 5,421,484 A | * | 6/1995 | Beach | 222/95 |
| 5,464,120 A | * | 11/1995 | Alpers et al. | 222/1 |
| 5,505,336 A | * | 4/1996 | Montgomery et al. | 222/82 |
| 5,688,423 A | * | 11/1997 | Rudewicz et al. | 219/501 |
| 5,799,832 A | * | 9/1998 | Mayo | 222/135 |
| 5,997,236 A | * | 12/1999 | Picioccio et al. | 414/403 |
| 6,105,820 A | * | 8/2000 | McGill | 222/95 |
| 6,126,983 A | * | 10/2000 | Miller | 426/565 |
| 6,299,025 B1 | * | 10/2001 | Watanabe et al. | 222/146.6 |
| 6,389,962 B1 | * | 5/2002 | Han et al. | 99/455 |
| 6,543,248 B2 | * | 4/2003 | Cathenaut et al. | 62/345 |

(Continued)

*Primary Examiner*—Gene O. Crawford
*Assistant Examiner*—Rakesh Kumar
(74) *Attorney, Agent, or Firm*—Robert C. Haldiman; Husch Blackwell Sanders LLP (57) ABSTRACT

A soft serve ice cream vending machine is disclosed. The vending machine includes a machine cabinet; a door pivotably connected to he machine cabinet; the door including a cup dispensing slot and an ice cream dispensing slot; a product dispensing button connected to the door; a cup dispenser adapted to dispense a cup and connected to the door; a money acceptor connected to the door; a flexible product container connected to a freezer engine adapted to receive a product, the freezer engine having an outlet proximate to the ice cream dispensing slot; a venturi air valve connected to the freezer engine; a spigot control device connected to the freezer engine and to the product dispensing button, whereby upon engagement of the product dispensing button the spigot control device engages the freezer engine for a predetermined period of time.

19 Claims, 11 Drawing Sheets

U.S. PATENT DOCUMENTS

| | | | |
|---|---|---|---|
| 6,625,993 B2 * | 9/2003 | Frank et al. | 62/68 |
| 2002/0014081 A1 | 2/2002 | Jones et al. | 62/66 |
| 2002/0017105 A1 | 2/2002 | Jones et al. | 62/135 |
| 2002/0040915 A1 | 4/2002 | Kim et al. | 222/146.6 |
| 2002/0043160 A1 | 4/2002 | Han et al. | 99/455 |
| 2002/0060229 A1 * | 5/2002 | Han et al. | 222/146.6 |
| 2002/0114212 A1 | 8/2002 | Ryoo et al. | 366/118 |
| 2002/0175127 A1 * | 11/2002 | Crowley et al. | 210/758 |
| 2002/0189268 A1 | 12/2002 | Jones et al. | 62/135 |
| 2003/0129289 A1 | 7/2003 | Henriksen et al. | 426/524 |
| 2005/0173462 A1 * | 8/2005 | Stumler et al. | 222/380 |

* cited by examiner

ICE CREAM VENDING MACHINE

CROSS-REFERENCE TO RELATED APPLICATIONS

This application claims priority from U.S. Provisional Patent Application No. 60/478,919 filed Jun. 16, 2003.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention relates generally to an apparatus for dispensing articles and, more particularly, to a method and apparatus for vending ice cream.

2. Related Art

U.S. Pat. No. 4,645,093 issued to Jones on Feb. 24, 1987 discloses a vending apparatus for vending individual servings of soft serve ice cream. The Jones apparatus includes a money activated switch, a selection switch, a container dispenser, a container rotator, an ice cream dispenser, and a syrup dispenser. The vending apparatus also includes coupling members for connection of pressurized water for periodic cleaning of the vending machine. The Jones apparatus has a complex arrangement which diminishes the repeatability of the vending machine. In other words, the complexity of the Jones device prohibits the vendee from consistently receiving a soft serve ice cream sundae of the type desired. For example, the Jones apparatus requires rotation of the ice cream cup as the ice cream is dispensed. The coordination of the various devices for dispensation of the soft serve ice cream inherently provides variation in the operation of the vending machine and the resulting product.

U.S. Pat. No. 5,027,698 to Chirnomas issued on Jul. 2, 1991 discloses an ice cream vending machine. The Chirnomas vending machine dispenses pre-filled containers of ice cream. Each container is filled with ice cream, sealed with a plastic lid, and the sealed containers are placed into the vending machine for dispensing. The Chirnomas apparatus includes an area for storing the pre-filled sealed cups and a device for dispensing one cup at time upon receipt of money. The Chirnomas device also includes apparatus for adding a secondary product such as a syrup, upon selection by a vendee. The Chirnomas apparatus does not disclose an apparatus for dispensing soft serve ice cream.

There remains a need in the art for a simplified soft serve ice cream vending machine that is capable of consistently providing a vendee with a quality soft serve product at an economical cost.

SUMMARY OF THE INVENTION

It is in view of the above problems that the present invention was developed. The invention is a soft serve ice cream vending machine. The soft serve ice cream vending machine includes a machine cabinet, a door, a product dispensing button, a cup dispenser, a money acceptor, a flexible product container, a freezer engine, a venturi air valve and a spigot control device. A vendee approaches the soft serve ice cream vending machine and places his or her money into the money acceptor. The money acceptor thereafter energizes the product dispensing button and sends a signal to the cup dispenser such that the cup dispenser dispenses a single cup. The vendee removes the dispensed cup and places it in an ice cream dispensing slot. The vendee then pushes the product dispensing button, and the product dispensing button sends a signal to the spigot control device. The spigot control device then engages the freezer engine such that soft serve ice cream product is dispensed from a spigot into the dispensed cup for a predetermined period of time.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
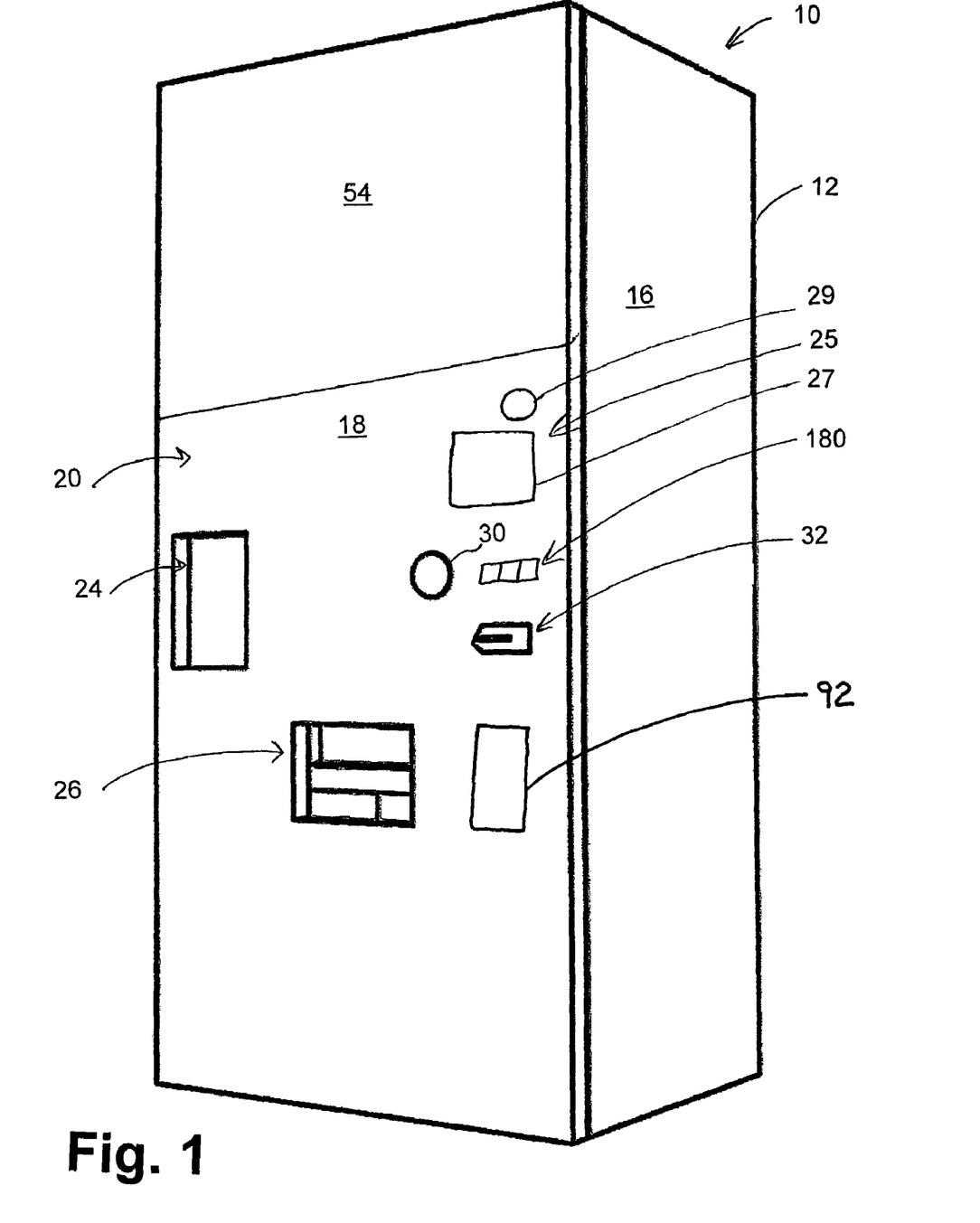
FIG. 1 is a perspective view of an exterior of an ice cream vending machine in a first embodiment.
Figure 2:
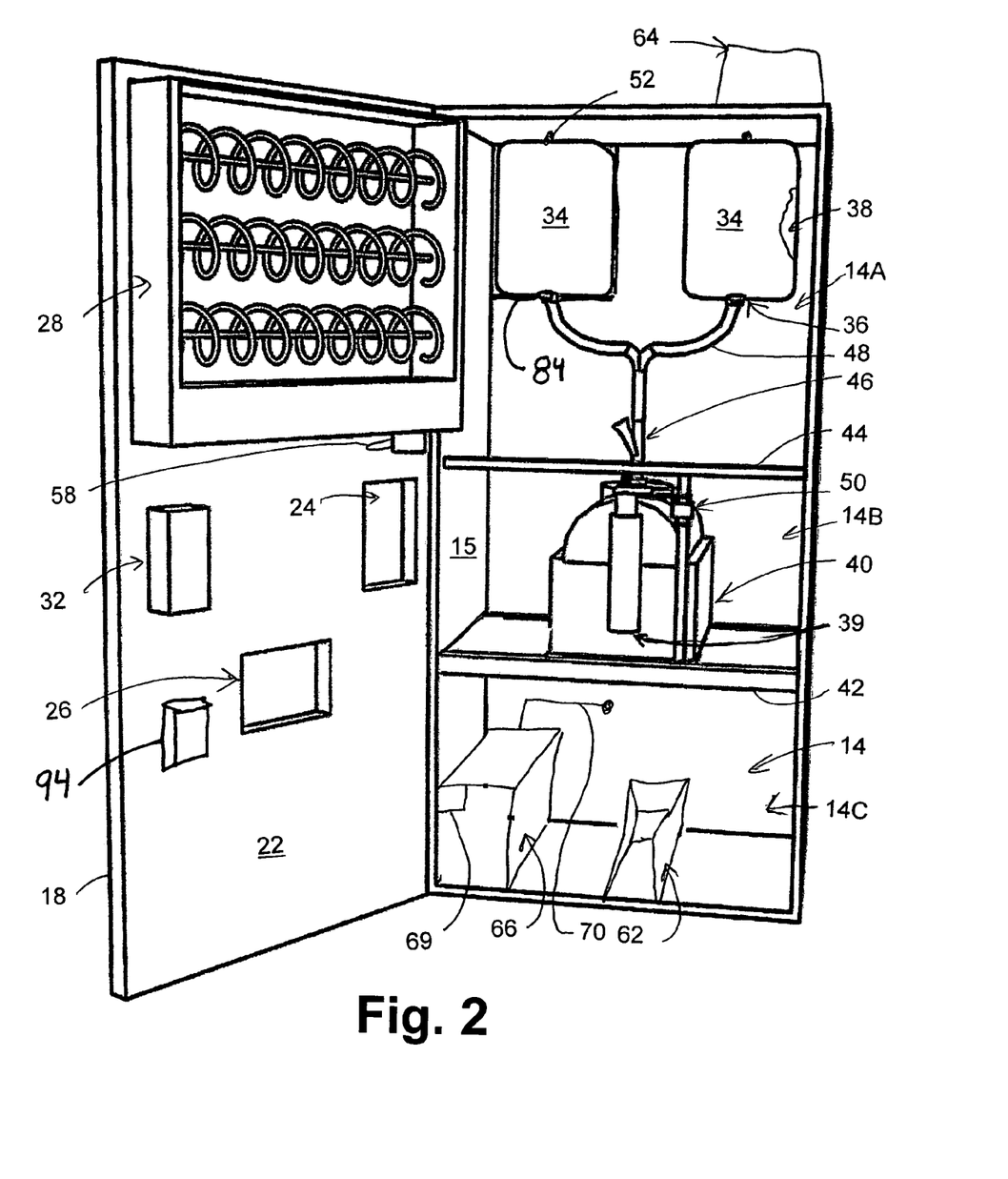
FIG. 2 is a perspective view of an interior of an ice cream vending machine in the first embodiment.

Referring to the accompanying drawings in which like reference numbers indicate like elements, FIGS. 1 and 2 illustrate an ice cream vending machine 10. The ice cream vending machine 10 includes a cabinet 12 having an interior 14 and an exterior 16. The ice cream vending machine 10 includes a door pivotably connected to the exterior 16 of the machine cabinet 12. In the depicted embodiment, both the machine cabinet 12 and the door 18 are comprised of thin gauge sheet metal; however, other materials may be used. The door 18 has an interior face 22 and an exterior face 20. The door 18 also includes a cup dispensing slot 24 and an ice cream dispensing slot 26. In some embodiments, the door 18 may include a lighted sign 54. For example, the lighted sign 54 may indicate which products are available from the ice cream vending machine 10. A product dispensing button 30 is mounted on the exterior face 20 of the door 18. In some embodiments, the product dispensing button 30 includes timing circuitry. A cup dispenser 28 is mounted to the interior face 22 of the door 18. In some embodiments, the cup dispenser 28 includes a cup dispensing sensor 58. The cup dispensing sensor 58 counts the number of cups which are dispensed.

In some embodiments, the door 18 includes an entertainment device 25 to entertain or otherwise distract a vendee. For example, the entertainment device 25 may be comprised of a video screen 27 and a speaker 29. As explained in greater detail below, the entertainment device 25 entertains the vendee while the ice cream vending machine 10 prepares the ice cream.

A money acceptor 32 is mounted to the exterior face 20 of the door 18. The money acceptor 32 includes a typical vault for receiving and safely containing the money inserted. The money acceptor 32 can be adjusted such that it sends a signal when a predeteremined amount of money has been received. The product dispensing button 30 is connected to the cup dispenser 28 and to the money acceptor 32. After the money acceptor has received the predetermined amount of money, the money acceptor 32 sends a signal to the cup dispenser 28 and enables or energizes the product dispensing button 30. Upon receipt of the signal, the cup dispenser 28 dispenses a single cup. In the depicted embodiment, the money acceptor 32 simultaneously sends the signal and enables the product dispensing button 30.

The ice cream vending machine 10 includes a flexible product container 34. In the depicted embodiment, the flexible product container 34 is comprised of a plastic pouch or bag, such as a polyester film food pouch. The flexible product container 34 provides an advantage in that it is flexible and disposable. The flexibility of the product container 34 reduces its susceptibility to damage. The disposability of the product container 34 improves the overall sanitation of the vending machine 10. Previously, it was necessary to periodically clean the container that held the food product. The flexible product container 34 eliminates this step while maintaining the sanitation of the vending machine 10.

The flexible product container 34 includes a product 38 and a valve 36. The product 38 may be any of various flavors, vanilla for example. In some embodiments, the product 38 must be refrigerated to preserve its shelf life. The valve 36 is an on/off valve which is utilized when replacing the flexible product container 34. The flexible product container 34 comes in different sizes. For example, the flexible product container 34 may be of a 2.5 gallon size or a 5 gallon size. Additionally, the ice cream vending machine 10 may include any number of flexible product containers 34. For example, the ice cream vending machine 10 may have 1, 2, 3 or 4 flexible product containers 34.

In the depicted embodiment, the flexible product container 34 includes a hanger 52. The hanger 52 is used to mount the flexible product container 34 to the interior 14 of the cabinet 12. In some embodiments, the machine cabinet 12 may include a shelf 84. The shelf 84 is mounted to the interior 14 of the machine cabinet 12. The shelf 84 can be used to support and protect the flexible product container 34. In the depicted embodiment, the shelf 84 is comprised of thin gauge sheet metal but other materials may be used. The hangar 52 and the shelf 84 can be used in combination but generally only one of the devices would be used to locate the flexible product container 34.

A freezer support 42 is mounted to the interior 14 of the machine cabinet 12. The freezer support 42 supports a freezer engine 40. The freezer engine 40 is mounted on the freezer support 42 and has an outlet 39 adjacent or approximate to the ice cream dispensing slot 26. The freezer engine 40 may be of various specific types well known to those skilled in the art such as the type manufactured by Zippy Freeze Inc., 12577 S. 265 W. #4Z, Draper, Utah 84020 and disclosed in U.S. Patent Application Publication 2003/0129289 published on Jul. 10, 2003, incorporated by reference herein.

The ice cream vending machine 10 also includes a support bar 44 mounted to the interior 14 in machine cabinet 12. The support bar 44 supports the venturi air valve 46. The venturi air valve 46 is mounted on the support bar 44 and connected to the freezer engine 40. The venturi air valve 46 provides additional air to the freezer engine 40. The freezer engine 40 injects the additional air into the product 38 to produce the soft serve ice cream. Tubing 48 connects the flexible product container 34 and the venturi air valve 46.

Figure 3:
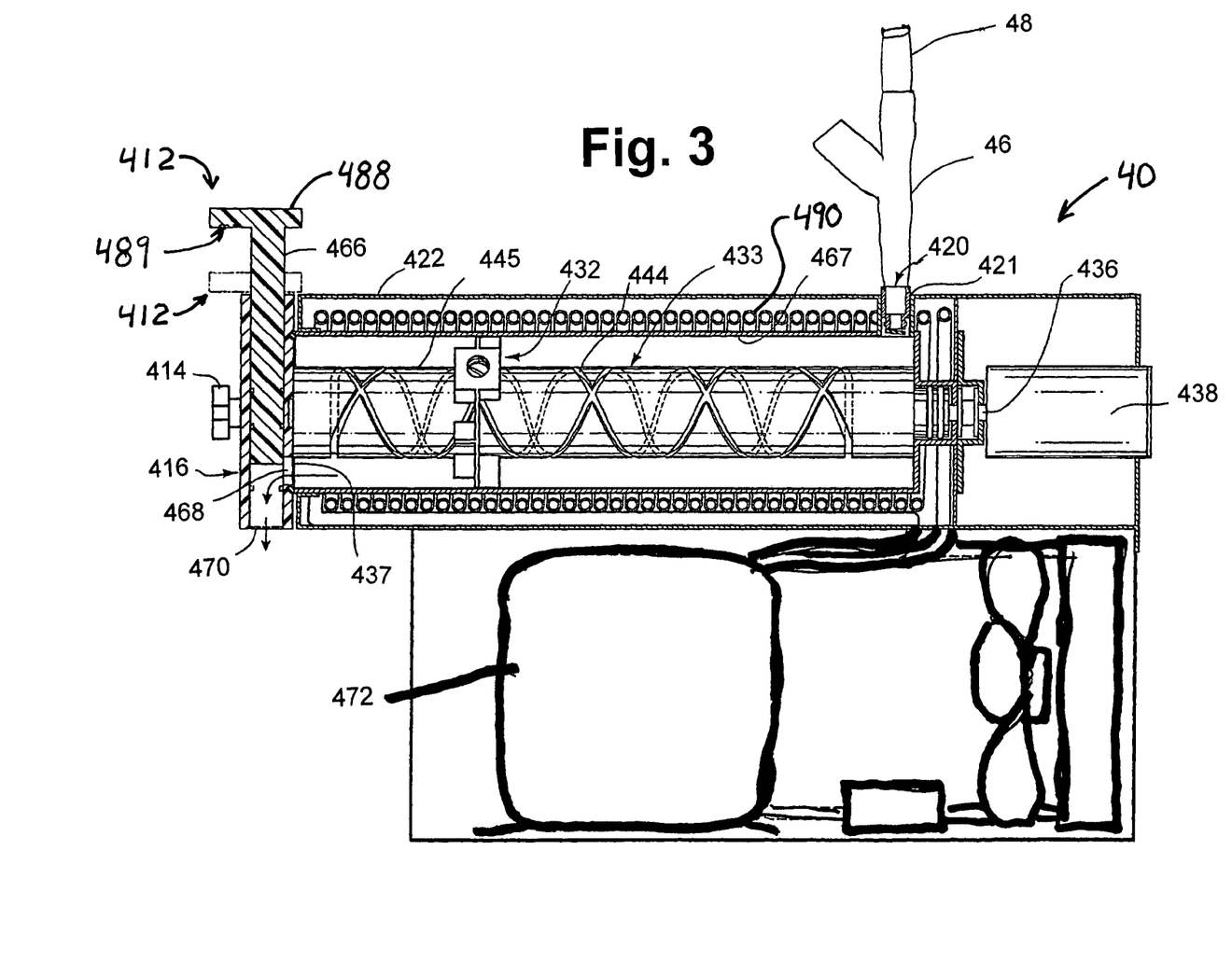
FIG. 3 is a partial sectional view of a freezer engine.

FIG. 3 illustrates the freezer engine 40. The freezer engine 40 includes a cooling canister 422 for holding the product as it cools and turns into ice cream. A dispensing block 416 is removably coupled, via retaining knob 414, to a front of the freezer engine 40. The cooling canister 422 is operatively connected to a housing 424. The housing 424 contains a conventional refrigeration device 472.

The cooling canister 422 is provided with a flux capacitor valve 420. The flux capacitor valve 420 is a one-way valve and is positioned on top of the cooling canister 422 so as to communicate with the interior of canister 422 at a location 421 farthest away from dispensing block 416. Flux capacitor valve 420 allows air into the canister 422 in order to permit the food product to be dispensed through dispensing block 416, as will be described in further detail below. In addition, the flux capacitor 420 provides an opening to canister 422 through which the food product 38 may be poured into the canister 422. Hence, venturi air valve 46 and the tubing 48 are in fluid communication with the flux capacitor valve 420.

The cooling canister 422 also includes an inner food container 467. Intermediate the cooling canister 422 and the inner food container 467 are cooling coils 490. The cooling coils 490 are fluidly connected to the conventional refrigeration device 472.

A mixing spindle 433 and a paddle wheel 432 are also located within the cooling canister 422. The mixing spindle 433 and the paddle wheel 432 mix the product 38. The mixing spindle 433 is driven by a motor 438. In the depicted embodiment, a coupling 436 connects the mixing spindle 433 and the motor 438. The mixing spindle 433 has a continuous, criss-crossing, recessed track 444 all around its lengthwise outer surface 445. As the mixing spindle 433 is rotated by the motor 438, the paddle wheel 432 moves in a back-and-forth helical movement. The back-and-forth helical movement causes the paddle wheel 432 to contemporaneously mix, whip, and scrape the food product 38. The paddle wheel 432 also pushes the frozen product 38 toward the dispensing block 416 for dispensing.

The product 38 flows by gravity from the product container 34 through the tubing 48 and through the venturi air valve 46. Thereafter, the product 38 enters the inner food container 467 through the flux capacitor valve 420. When the inner food container 467 is full, the flux capacitor valve 420 automatically prevents additional product from entering the inner food container. The rotating mixing spindle 433 and the paddle wheel 432 mix the product 38. Simultaneously, the product 38 is refrigerated by the cooling coils 490.

After the ice cream is mixed, a dispensing handle 412 is placed in an up position to allow frozen food in the cooling canister 422 to exit through a front opening 437, into a hole 468 in the dispensing block 416, and out of bottom hole 470. The dispensing handle 412 includes a shaft portion 466, a grip portion 488 and engaging face 489 located on a bottom of the grip portion 489. During dispensing, air enters to the canister 422 through the flux capacitor 420. The handle 412 may then be pushed into a down position (to the position shown in phantom lines), thereby pushing the product that is in the dispensing block 416 through the bottom hole 470 for final dispensing.

Referring once again to FIG. 2, a spigot control device 50 is connected to the freezer engine 40. The spigot control device 50 controls the amount of ice cream which is dispensed via the dispensing block 416 as shown in FIG. 3. The spigot control device 50 is also connected to the product dispensing button 30. When the product dispensing button 30 is engaged, the spigot control device 50 opens the handle 412 for a predetermined period time. In this manner, a preset amount of ice cream is dispensed, and it should be noted that the preset amount is controlled by the length of time the handle 412 is open. For example, if more ice cream is desired, then the handle 412 is open for a longer period of time.

The interior 14 of the machine cabinet 12 includes three distinct portions defined by the freezer support 42 and the support bar 44. These three sections are respectively labeled 14A, 14B, and 14C. A select temperature range may be maintained in each section 14A, 14B, and 14C. For example, section 14A may be maintained at 35 to 55 degrees Fahrenheit, while section 14B is maintained from 15 to 35 degrees Fahrenheit, and section 14C is open to ambient air. In the depicted embodiment, section 14B is maintained at approximately 38 degrees Fahrenheit. Alternatively, all three sections 14A, 14B, and 14C are maintained in the same temperature range. In the depicted embodiment, sections 14A, 14B are maintained at approximately the same temperature range. To reduce the amount of energy required to maintain the respective temperature zone, insulation 15 is operatively connected to the interior 14 of the machine cabinet 12. In the depicted embodiment, refrigeration of sections 14A and 14B is provided by the conventional refrigeration device 472. However, those skilled in the art will understand that each section may have its own cooling device. Additionally, it should be noted that if section 14C is cooled, it can be used as an additionally storage area for the product 38.

Generally, the ice cream vending machine 10 requires alternating current for operation. However, in some embodiments, the ice cream vending machine 10 includes a battery 62 and solar panel charger 64. The ice cream vending machine 10 is run by the battery 62, and the battery 62 is recharged by the solar panel charger 64. This allows the ice cream vending machine 10 to be a stand alone device.

In some embodiments, the ice cream vending machine 10 includes a computer 66. In the depicted embodiment, the computer 66 is mounted in the interior 14 of the machine cabinet 12. The computer 66 includes a data structure and a modem 69. The data structure is used by the computer 66 in controlling the spigot control device as explained in greater detail below. In the depicted embodiment, the computer 66 is connected to a network 70. For example, the computer 66 may be connected to a global computer network, such as the Internet, or a local area network. If the vending machine 10 is run by the battery 62, the modem 69 may be a wireless modem such that the computer 66 can wirelessly connect to the network 70.

In some embodiments, the computer 66 is connected to the cup dispensing sensor 58. As such, the computer 66 can monitor the inventory status of the cup dispenser 28, the inventory status of the product 38, the status of the battery 62 and send a status notice via the network 70 to an operator. For example, the computer 66 can send an e-mail notice to a vendor.

Figure 4:
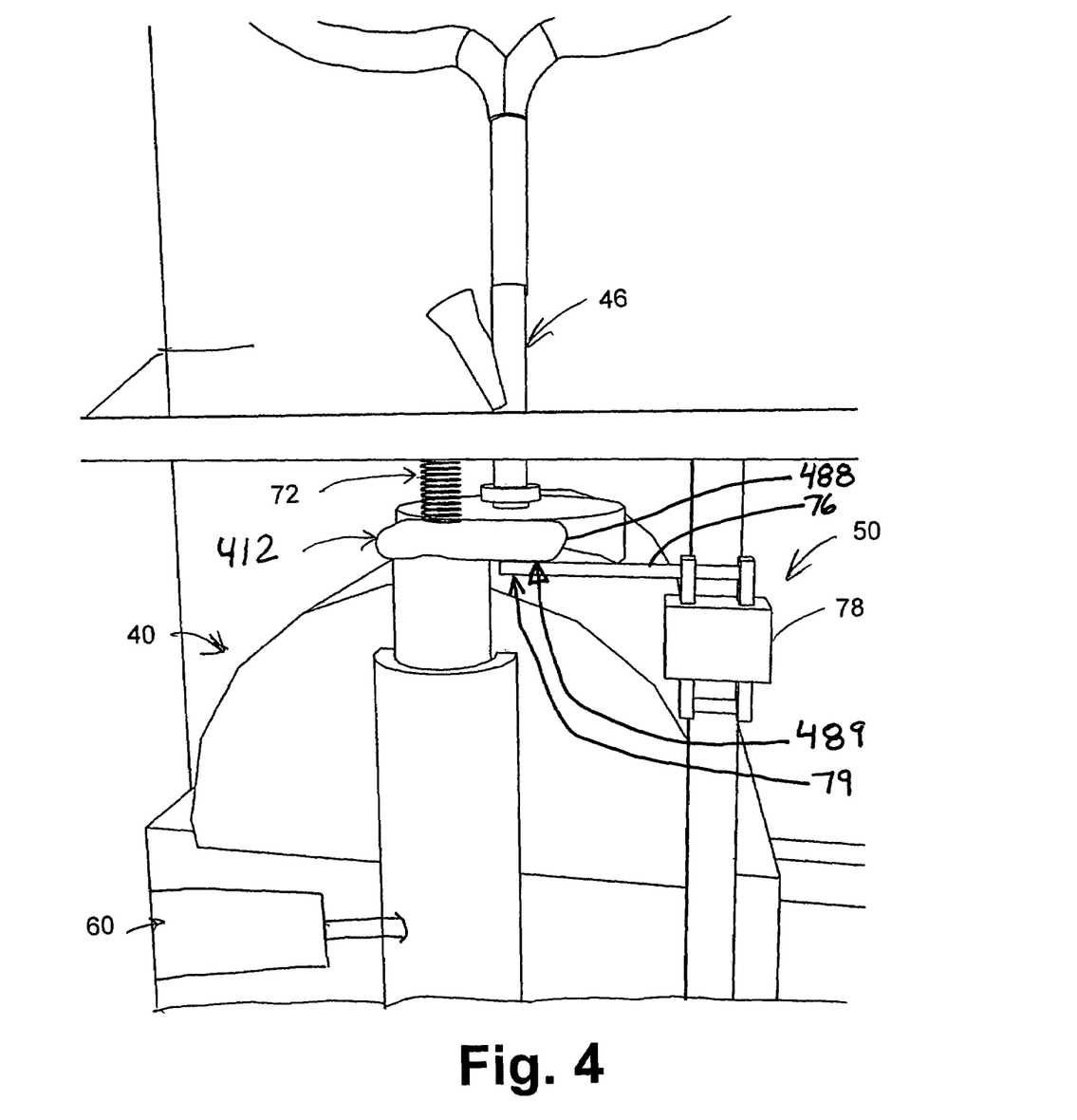
FIG. 4 is a detailed view a spigot control device in a first embodiment.

Referring now to FIG. 4, the spigot control device 50 operates or controls the dispensing block 416. In the embodiment depicted in FIG. 4, the spigot control device 50 includes a linear solenoid 78 and a return spring 72. In the depicted embodiment, the return spring 72 is an expansion spring. The linear solenoid 78 moves up and down to turn the dispensing block 416 on and off by moving the handle 412 up and down. In FIG. 4, the handle 412 is in the off position. The return spring 72 biases the spigot 76 into the off position. In other words, the linear solenoid must overcome the bias of the return spring 72 to put the handle 412 in the on position. In the depicted embodiment, a rod 76 operatively connects the linear solenoid 78 to the handle 412. A tip 79 of the rod 76 pushes on the engaging face 489 of the grip portion 488 to push the handle 412 upwardly to an on position. When the solenoid 78 is disengaged, the return spring 72 pushes on the top of the grip portion 488 to push the handle downwardly to an off position.

In some embodiments, the ice cream vending machine 10 may include a syrup dispenser 60. In the embodiment depicted in FIG. 4, the syrup dispenser 60 is mounted on the front of the freezer engine 40 and is operatively connected to the dispensing block 416. In this manner, the syrup dispenser 60 injects syrup into the dispensing block 416 before or after the ice cream is dispensed.

Alternatively, a vendee may receive a packet of syrup via a packet dispensing slot 92. The packet dispensing slot 92 is provided within the exterior face 20 of the door 18. A packet dispenser 94 is operatively connected to the interior face 22 of the door 18 and in communication with the packet dispensing slot 92. The packet dispenser 94 can contain one or more flavor types of packets. A vendee can select the particular flavor he or she desires via a flavor section switch 180 (described in greater detail below). In the depicted embodiment, the product dispensing button 30 also energizes the packet dispenser 94 such that a single packet is dispensed from the packet dispenser 94 and into the packet dispensing slot 92. After the ice cream is dispensed, the vendee opens the dispensed packet and pours the syrup from the packet onto the dispensed ice cream.

Figure 5:
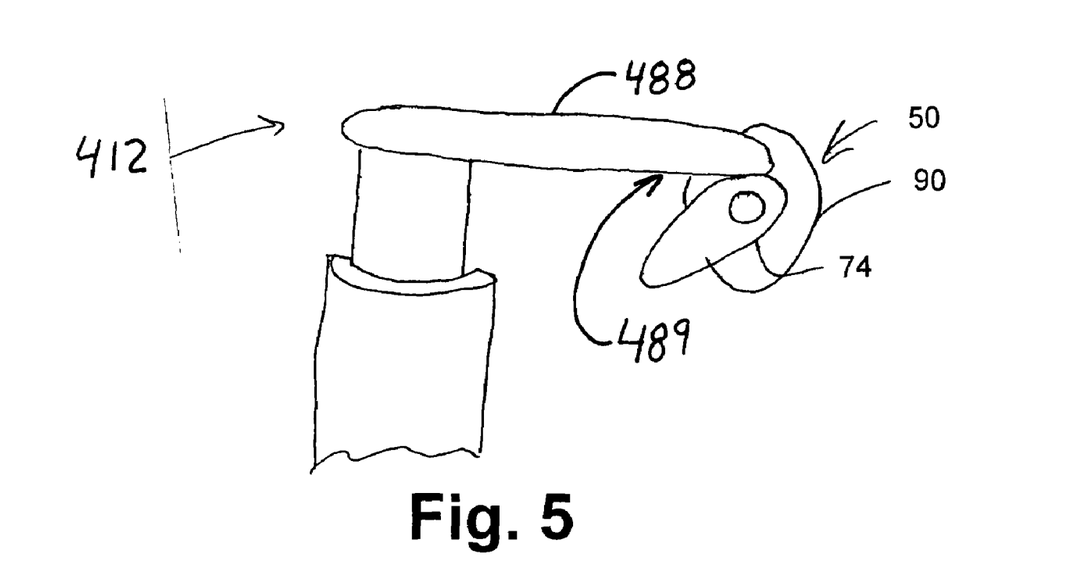
FIG. 5 is an alternative embodiment of the spigot control device.

FIG. 5 illustrates a second embodiment of the spigot control device 50. In the embodiment depicted in FIG. 5, the spigot control device 50 includes a cam 74. The cam 74 is rotated by a motor 90, for example a sun gear motor, an air motor, or other high torque device. The motor 90 rotates the cam 74 at a set speed. Depending upon the rotational speed of the motor 90, the handle 412 is put in the on position for a period of time. By controlling the rotational speed of the motor 90, the amount of ice cream dispensed can be controlled. As the cam 74 rotates, it pushes against the engaging face 489 of the grip portion 488. The cam 74 moves the handle 412 upwardly into an on position. In some embodiments, the cam and motor combination may be assisted by a return spring, such as a compression or an expansion spring.

Figure 6:
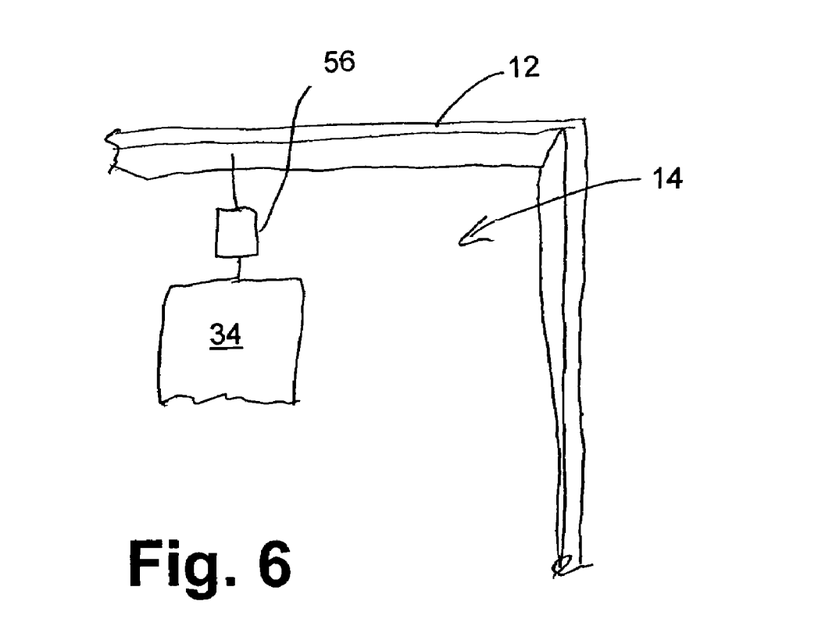
FIG. 6 is a detailed view of a product sensor.

FIG. 6 illustrates a product sensor 56. The product sensor 56 is mounted in between the flexible product container 34 and the machine cabinet 12. As an example, the product sensor 56 may sense a weight of the flexible product container 34. By sensing the weight of the flexible product container 34, the product sensor 56 can relay information about the amount product left in the container 34. The product sensor 56 may be connected to the computer 66. In this manner, the computer 66 can monitor the status of the product and send a notice via the network 70 if the product is low.

Figure 7:
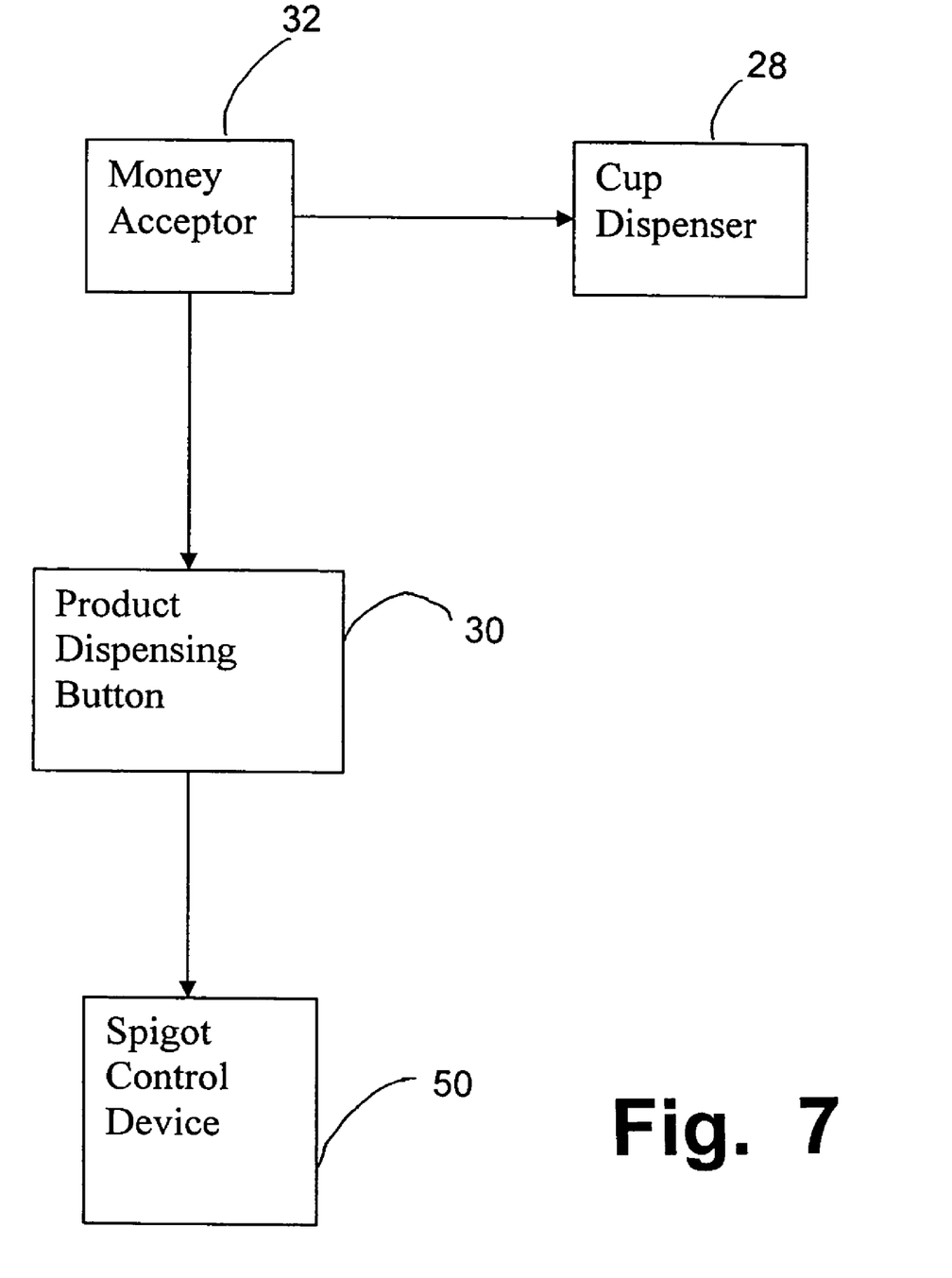
FIG. 7 is a block diagram for the first embodiment.

Referring now to FIG. 7, in operation, a vendee approaches the vending machine 10. The vendee places a predetermined amount of money into the money acceptor 32. After the predetermined amount of money is received, the money acceptor 32 sends a signal to the cup dispenser 28. Simultaneously, the money acceptor 32 energizes the product dispensing button 30. As an example, the product dispensing button 30 may light up to indicate that it is energized. Once the cup dispenser 28 receives the signal, it dispenses a single cup into the cup dispensing slot 24. The vendee removes the dispensed cup and places it in the ice cream dispensing slot 26. The vendee then presses the product dispensing button 30. The product dispensing button 30 engages the spigot control device 50 for a period of time using the timing circuitry. The timing circuitry is adjustable, and it is set to allow the spigot control device 50 to put the handle 412 in the on position for a period of time such that a serving of ice cream, 8 ounces for example, is dispensed. The timing circuitry may need to be adjusted up or down depending upon the flow rate of the product 38. As such, after the product dispensing button 30 is pushed, a predetermined amount of ice cream is dispensed into the cup. The separation of the cup dispensation and the ice cream dispensation greatly improves the reliability and repeatability of the ice cream vending machine 10.

In general, ice cream becomes granulated after it is frozen for about three hours. Thus, if the vending machine 10 is in a low volume area and a serving is not vended within a three hour period, the ice cream begins to diminish in quality. To avoid this situation, in some embodiments the vending machine prepares a single serving for each vendee. In other words, a single shot vend is mixed fresh upon a vendee placing his or her money in the vending machine 10. Although the single shot vend greatly improves cleanliness and product quality, the vendee must wait approximately 30 to 45 seconds between the time the vendee places the money into the money acceptor 32 until the time that the ice cream is ready for dispensation. Accordingly, some embodiments include the entertainment device 25. The entertainment device 25 entertains the vendee while he or she is waiting for preparation of the ice cream.

Figure 8:
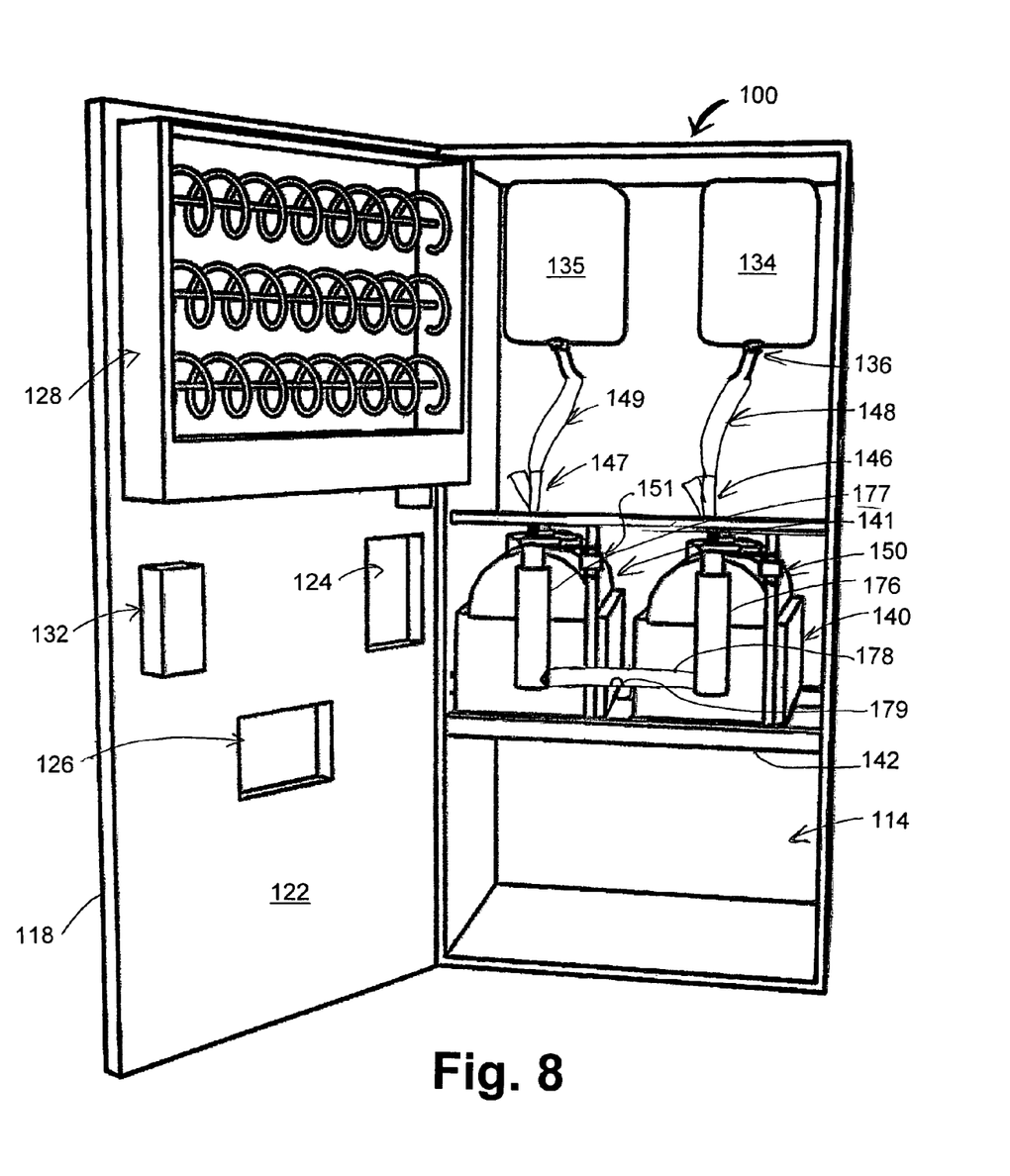
FIG. 8 is an interior view of the ice cream vending machine in a second embodiment.

FIG. 8 illustrates a second embodiment of the ice cream vending machine generally indicated by numeral reference 100. The ice cream vending machine 100 includes a machine cabinet 112, a door 118, a first flexible product container 134, a second flexible product container 135, a freezer support 142, a first freezer engine 140, a second freezer engine 141, a support bar 144, a venturi air valve 146, a second venture air valve 147, first tubing 148, second tubing 149, a first spigot control device 150, a second spigot control device 151, and the flavor selection switch 180 (best seen in FIG. 1). The first freezer engine 140 has a first dispensing block 176, and the second freezer engine 141 has a second dispensing block 177. In the depicted embodiment, the first and second dispensing blocks 176,177 are connected by a chute 178. A chute outlet 179 is located in about the middle of the chute 178. The first container 134 and the second container 135 each contain a product. As an example, each container may contain a product having a flavor different than the other. Each container 134, 135 is respectively connected to the freezer engine 140, 141. In this manner, the freezer engines 140, 141 can dispense different flavors of ice cream. The freezer engines 140, 141 can dispense a single flavor or a combination of different flavors. The flavor selection switch 180 is connected to the first spigot control device 150 and to the second spigot control device 151. A vendee makes a selection by utilizing the flavor selection switch 180. As an example, the vendee can push one or more buttons on the flavor selection switch 180 to select various flavors. Thereafter, when the vendee pushes or engages the product dispensing button 130, the flavor selection switch 180 sends a signal to the first spigot control device 150, the second spigot control device 151 or to both spigot control devices 150, 151. The spigot control devices operate the respective dispensing block 176, 177 such that ice cream is dispensed via the chute 178.

Figure 9:
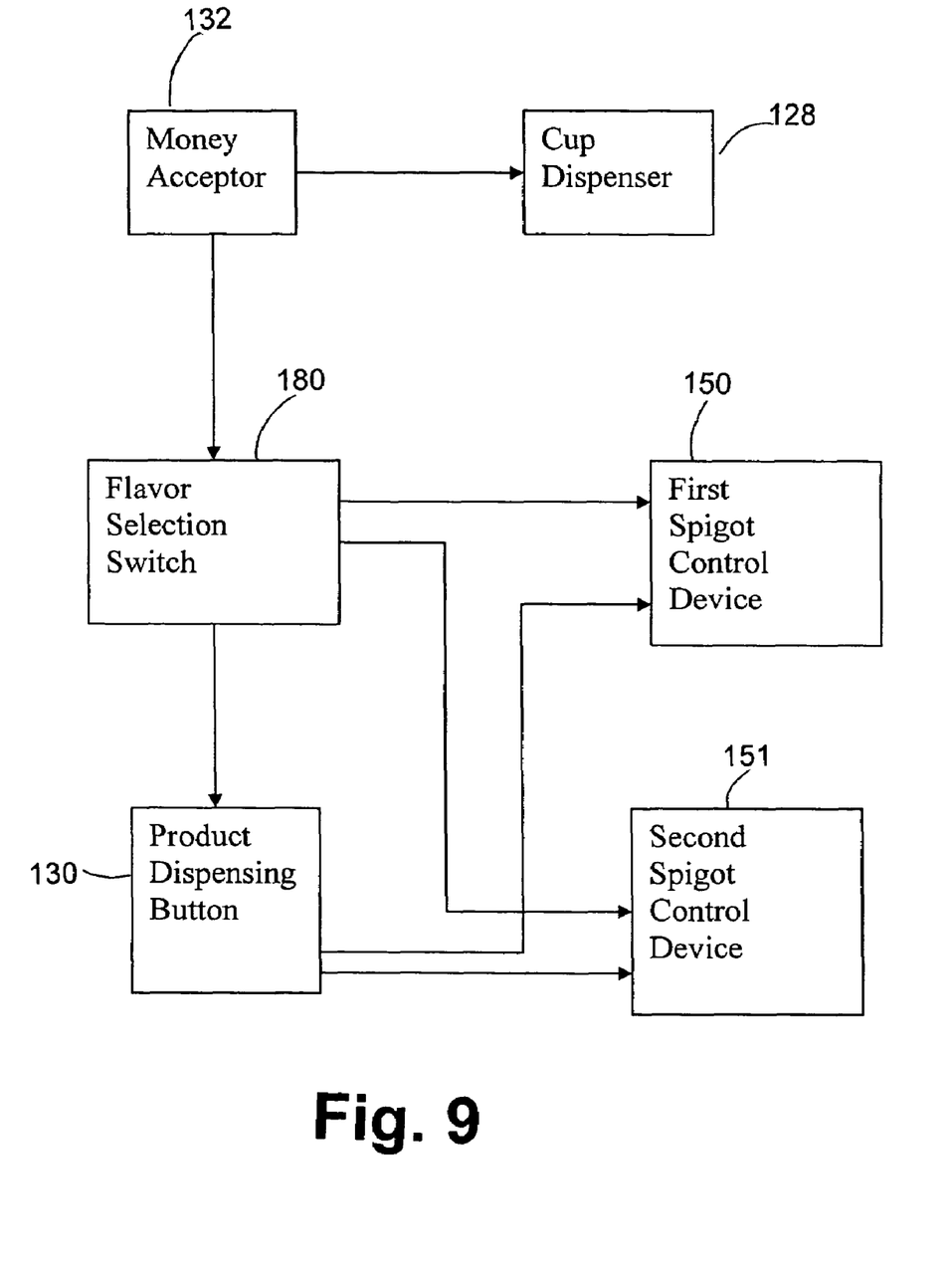
FIG. 9 is a block diagram for the first embodiment.

Referring now to FIG. 9, in operation, a vendee approaches the vending machine 100. The vendee places a predetermined amount of money into the money acceptor 132. The vendee makes a flavor selection via the flavor selection switch 180. After the predetermined amount of money is received, the money acceptor 132 sends a signal to the cup dispenser 128. Simultaneously, the money acceptor 132 energizes the product dispensing button 130 by sending a signal to the flavor selection switch 180. As an example, the product dispensing button 130 may light up to indicate that it is energized. Once the cup dispenser 128 receives the signal, it dispenses a single cup into the cup dispensing slot. The vendee removes the dispensed cup and places it in the ice cream dispensing slot. The vendee then presses the product dispensing button 130. The product dispensing button 30 sends a signal to both the first spigot control device 150 and to the second spigot control device 151. The signal is sent from the product dispensing for a period of time using the timing circuitry. While the signal is sent to both the the first spigot control device 150 and to the second spigot control device 151, the flavor selection switch 180 controls which spigot control device will be engaged. As such, after the product dispensing button 130 is pushed, a predetermined amount of ice cream is dispensed into the cup.

Figure 10:
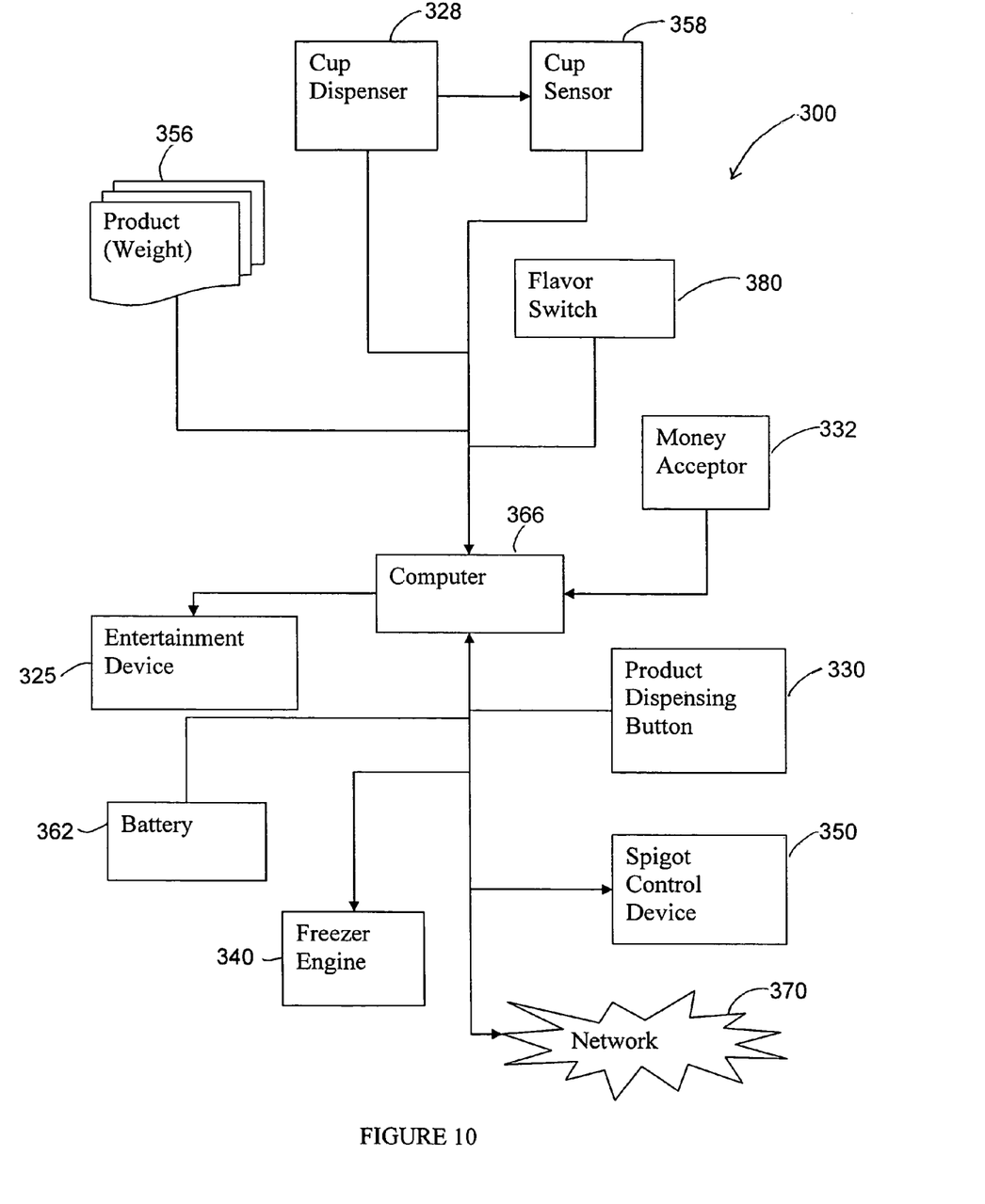
FIG. 10 is a block diagram of a control system.
Figure 11:
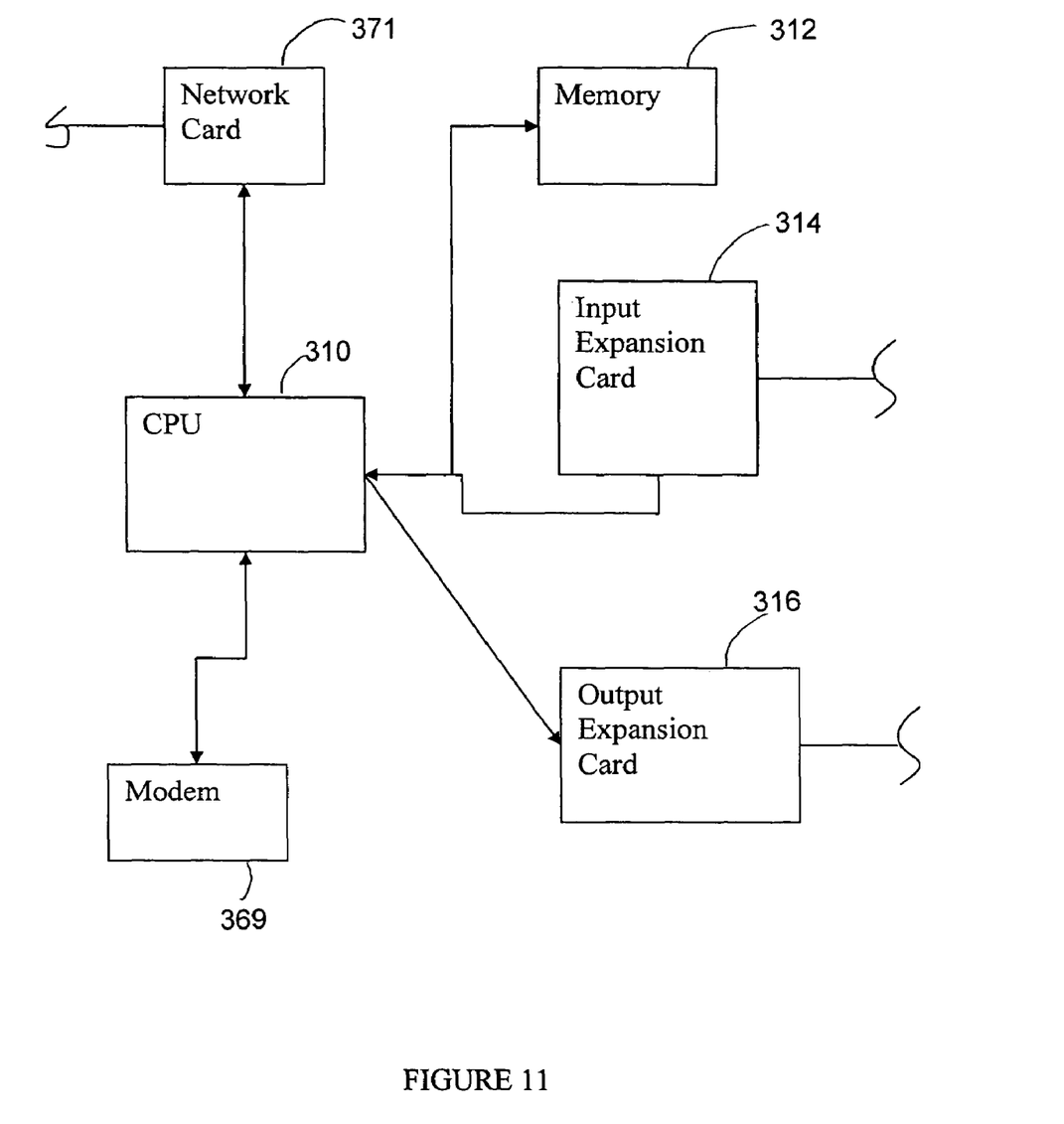
FIG. 11 is a block diagram of the computer depicted in FIG. 10.

FIGS. 10 and 11 illustrate a control system 300 for the ice cream vending machine. The control system 300 includes a computer 366, a product sensor 356, a cup dispensing sensor 358, a money acceptor 332, a flavor switch 380, a product dispensing button 330, a spigot control device 350, a network 370, a freezer engine 340, a battery 362, and an entertainment device 325. The computer 366 includes a central processing unit (CPU) 310, a memory 312, an input expansion card 314, and an output expansion card 316. The computer 366 may also include a network card 371. The network card 371 operatively connects the computer 366 to the network 370. In the depicted embodiment, the computer 366 also includes a modem 369.

The computer 366 receives input from the product sensor 356, the cup dispensing sensor 358, the money acceptor 332, the flavor switch 380, and the product dispensing button 330. In the depicted embodiment, the computer 366 receives the input via the input expansion card 314. The input is stored in the memory 312. A vendor may call the modem 369 and enter a touch tone to retrieve the stored input. Additionally, the computer may send the stored input to a vendor via the network 370. Yet in other embodiments, the computer 366 may dial into another computer via the modem 369 and upload the stored input. Still in other embodiments, the computer 366 may receive an email from the vendor via the network 370 and send a reply email indicating a status of one or more components.

In some embodiments, the computer receives status information on vital components of the vending machine 10, 100, such as battery status data from the battery 362 or freezer engine status from the freezer engine 340. For example, the computer 366 may monitor the power or torque used by the motor 438. If the power requirements of the motor 438 spike significantly, it is possible that ice has formed around a portion of the mixing spindle 433. In such a case, the computer 366 could send a maintenance notice. Additionally, the computer 366 could indicate that the vending machine 10, 100 is temporarily out of service via the entertainment device 325. Moreover, the computer 366 shut down the freezer engine 340 to prevent damage.

The product sensor 356 provides the computer 366 with product data regarding the amount of product available for dispensation. Similarly, the cup dispensing sensor 358 provides the computer 366 with cup data on the number of cups available for dispensation or the number of cups that have been dispensed. The computer 366 stores these data variables in the memory 312. The computer 366 can monitor these variables in the memory 312 and send a maintenance notice to a user if one of the variables is beyond a specified limit. For example, the computer 366 may send the maintenance notice over the network 370. In the depicted embodiment, the computer 366 automatically generates an e-mail to a vendor to provide a maintenance notice. The email includes a message specifying that one or more items need maintenance or simply that the vending machine 10, 100 requires maintenance. In some embodiments, a vendor may connect to the computer 366 via the network 370, such as the Internet, and inquire the value of each variable stored in the database.

In the depicted embodiment, the computer also received input from the money acceptor 332. If the money acceptor 332 is full of money, then the computer 366 sends a notice to the vendor.

The computer 366 also receives input from the money acceptor 332, the flavor switch 380, and the product dispensing button 330. In the depicted embodiment, the computer 366 receives the input via the input expansion card 314. In this manner, the computer 366 can identify when a vendee has placed the appropriate amount of money in the money acceptor 332, has made a flavor selection via the flavor selection switch 380, and is ready for the ice cream to be dispensed. Thereafter, the computer 366 can send a signal to the spigot control device 350 via the output expansion card 316. In the depicted embodiment, the computer 366 first verifies that a cup and a product are available before sending the signal to the spigot control device 350. In some embodiments, the computer also sends a signal to a cup dispenser 328. Because the computer 366 has an internal clock or counter, it is well suited for controlling the length of time the spigot control device 350 holds open the spigot. Additionally, the computer 366 can count the number of servings that are dispensed.

The computer 366 is also connected to the entertainment device 325. The computer 366 includes memory for storing video clips, audio clips, advertisements, and the like for broadcast on the entertainment device 325. As an example, the computer 366 may play an audio clip through the speaker 29 that indicates the status of the ice cream as it is prepared. In another example, the computer 366 may play music, such as a marching tune. In another example, the computer 366 may play a cartoon via the video screen 27.

Figure 12:
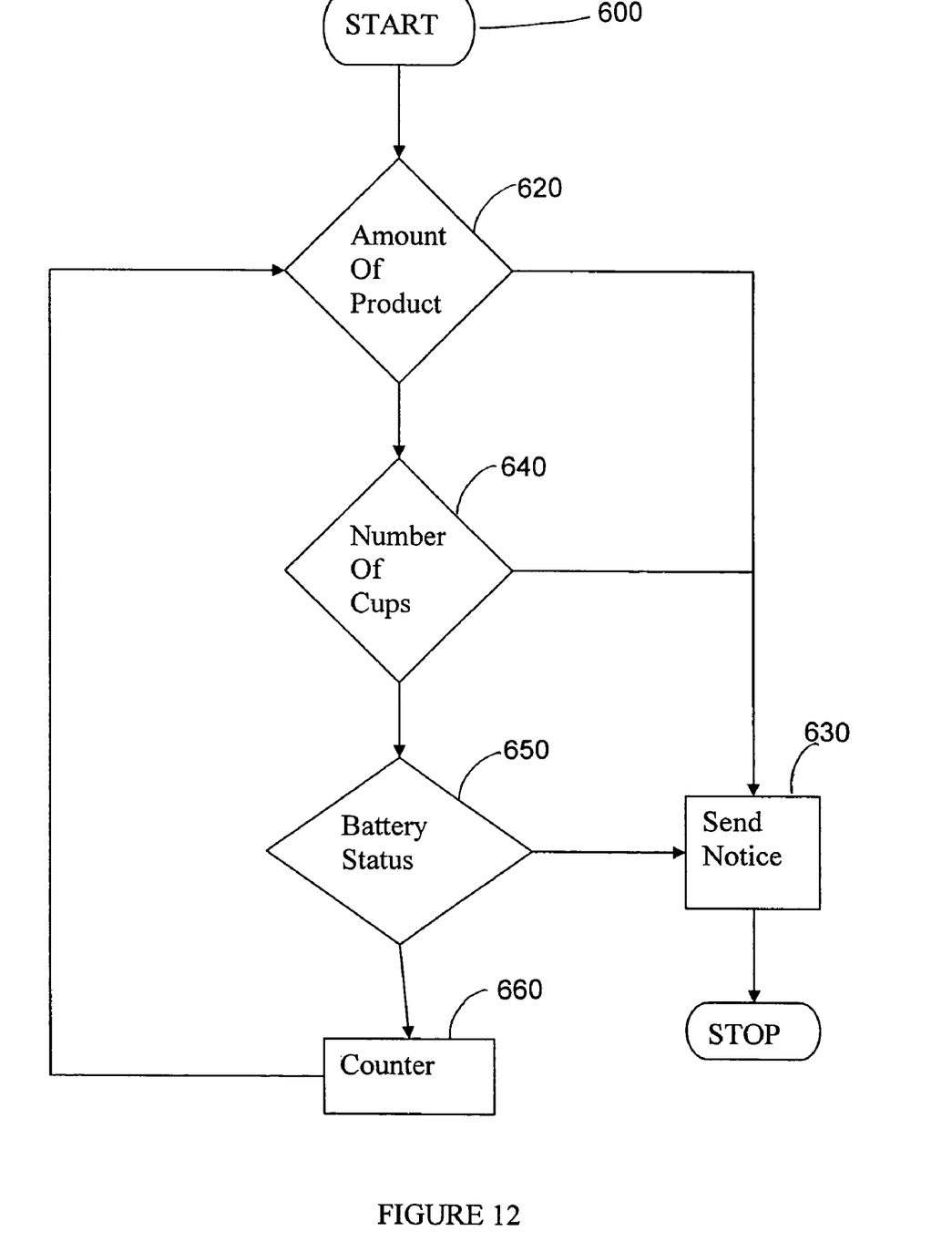
FIG. 12 is a flow chart corresponding to the control system.

FIG. 12 illustrates a flow chart for checking maintenance status. In the depicted embodiment, the status variables chosen are merely illustrative and other status variables may be chosen. For example, in some embodiments the computer 366 may check freezer engine status. In a first step 600, the computer 366 begins the routine. In a second step 620, the computer 366 inquires the memory 312 as to the amount of product that remains and makes a decision whether the amount is less than a specified limit. As an example, the computer 366 receives a weight input from the product sensor 358 via the input expansion card 314. The input is in the form of weight of the product. The computer 366 compares the input with a standard that is stored in memory 312, in other words a specified amount. For example, the standard may be two pounds. If the weight is less than the specified amount, then the computer sends a maintenance notice in step 630. If the weight is greater than the specified amount, then the routine continues to step 640. In step 640, the computer inquires the database as to the number of cups dispensed. The computer 366 compares the retrieved number to a standard stored in memory 312. For example, the standard may be 750 cups. In other words, the cup dispensing sensor has counted 750 dispensed cups. If the number of cups dispensed is greater than the specified amount, then the computer sends a maintenance notice in step 630. If the number of cups is less than the specified amount, then the routine continues to step 650. In step 650, the computer inquires the database as to the battery status. The computer 366 compares the retrieved number to a stored standard. For example, the standard may be 36 volts. If the battery status is less than the specified amount, then the computer sends a maintenance notice in step 630. If the battery status is greater than or equal to the specified amount, then the routine continues to the counter step 660. The counter in step 660 allows the routine to idle for a period of time before resuming the inquiry for each variable. For example, the routine may be idle for several minutes or several hours. After the counter reaches the specified count, the routine returns to step 620. Thereafter, the routine repeats until terminated. The routine is terminated when the computer 366 sends a maintenance notice in step 630. The routine may be manually reset or may resume automatically after a period of time, for example four hours.

To replace the flexible product container 34, a user turns the valve 36 to an off position. The user disconnects the flexible product container 34 from the tubing 48. The user removes the flexible product container 34 and replaces it with a new one. Thereafter, the user reconnects the tubing 48 to the new flexible product container 34 and turns the valve 36 to an on position.

There is also provided a method of assembling an ice cream vending machine. The method comprises the steps of: providing a machine cabinet having an interior and an exterior; pivotably connecting a door to said exterior of said machine cabinet, said door having an interior face and an exterior face, said door including a cup dispensing slot and an ice cream dispensing slot; connecting a product dispensing button to said exterior face of said door; connecting a cup dispenser adapted to dispense a cup to said interior face of said door; connecting a money acceptor to said exterior face of said door, wherein said product dispensing button is enabled and said cup dispenser dispenses said cup upon acceptance of a predetermined amount of money; connecting at least one flexible product container to said interior of said machine cabinet, each of said at least one flexible product container having a valve and containing a product; connecting a freezer support to said interior of said machine cabinet; connecting at least one freezer engine to said freezer support, said at least one freezer engine adapted to receive said product and having an outlet proximate to said ice cream dispensing slot; connecting a support bar to said interior of said machine cabinet; mounting a venturi air valve to said support bar and to said at least one freezer engine; interconnecting a plurality of tubing to said at least one flexible product container and to said venturi air valve; and connecting a spigot control device to said at least one freezer engine and to said product dispensing button, whereby upon engagement of said product dispensing button, said spigot control device engages said freezer engine for a predetermined period of time.

There is also provided a method of vending ice cream. The method comprises the steps of: receiving money in a first step; enabling a product dispensing button after said step of receiving said money; dispensing a cup while simultaneously enabling said product; placing said dispensed cup within an ice cream dispensing slot; engaging a flavor selection switch; engaging said product dispensing button; sending a signal to at least one spigot control device after said product dispensing button has been engaged; and dispensing ice cream for a predetermined period of time after said at least one spigot control device has received said signal.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A soft serve ice cream vending machine apparatus comprising:
   a. a machine cabinet having an interior and an exterior, the machine cabinet including insulation along the interior to maintain a temperature within the interior;
   b. a door pivotably connected to said exterior of said machine cabinet, said door having an interior face and an exterior face, said door including a cup dispensing slot and an ice cream dispensing slot;
   c. a product dispensing button operatively connected to said exterior face of said door;
   d. a cup dispenser adapted to dispense a cup and operatively connected to said interior face of said door;
   e. a money acceptor operatively connected to said exterior face of said door, wherein said product dispensing button is enabled and said cup dispenser dispenses said cup upon acceptance of a predetermined amount of money;
   f. at least one flexible product container operatively connected to said interior of said machine cabinet, each of said at least one flexible product container having a valve and containing a product;
   g. a freezer support operatively connected to said interior of said machine cabinet;
   h. at least one freezer engine adapted to receive said product, said freezer engine operatively connected to said freezer support and having a spigot proximate to said ice cream dispensing slot;
   i. a support bar operatively connected to said interior of said machine cabinet;
   j. a venturi air valve operatively mounted to said support bar and operatively connected to said at least one freezer engine;
   k. a plurality of tubing interconnecting said at least one flexible product container and said venturi air valve; and
   l. a spigot control device operatively connected to said freezer engine and to said product dispensing button, whereby upon engagement of said product dispensing button said spigot control device opens said spigot for a predetermined period of time; and
   m. a plurality of temperature zones, each of said temperature zones insulated by said insulation to maintain a different temperature from other temperature zones.

2. The apparatus according to claim 1, wherein said at least one flexible product container includes a hangar.

3. The apparatus according to claim 1, wherein said spigot control device is a solenoid.

4. The apparatus according to claim 1, wherein said spigot control device is a cam and motor.

5. The apparatus according to claim 1, wherein said at least one flexible product container is a plastic bag.

6. The apparatus according to claim 1, further comprising a product sensor to determine a level of product in said flexible product container.

7. The apparatus according to claim 1, further comprising a cup dispensing sensor operatively connected to said cup dispenser.

8. The apparatus according to claim 1, further comprising at least one other freezer engine.

9. The apparatus according to claim 1, further comprising a syrup dispenser.

10. The apparatus according to claim 1, further comprising a battery and solar charger.

11. The apparatus according to claim 1, further comprising a computer operatively mounted to said interior of said machine cabinet.

12. The apparatus of claim 1, further comprising a modem operatively connected to said computer.

13. The apparatus of claim 1, further comprising a network operatively connected to said computer.

14. The vending apparatus of claim 1 wherein a mixing chamber is in a first temperature zone and a product container is in a second temperature zone, said first temperature zone being colder than said second temperature zone and each of said temperature zones being colder than an ambient temperature.

15. The vending apparatus of claim 1 wherein said temperature zones are separated by a temperature separation panel.

16. The vending apparatus of claim 1 wherein said mixing chamber is configured to be loaded with a single serving of product and to dispense said single serving without further loading of said mixing chamber.

17. The vending apparatus of claim 1 further comprising:
   a dispensing outlet in a mixing chamber;
   a gate in sliding contact with said outlet such that said gate may open and close said outlet;
   an actuator of said gate, said actuator being variable such that said gate may open said outlet to a selectable area such that a dispensing rate is thereby selectable.

18. The vending apparatus of claim 1 wherein said actuator was a cam.

19. The vending apparatus of claim 1 further comprising a processor configured to signal a maintenance status, said signal being responsive to a sensor, said sensor being at least one of a product weight; an engine torque; a battery charge level; a remaining capacity of a money box and a remaining capacity of a cup dispenser.

* * * * *